No. 801,039. PATENTED OCT. 3, 1905.
M. NIKOLIC.
SAFETY DEVICE FOR TRAINS.
APPLICATION FILED JUNE 30, 1905.

No. 801,039. PATENTED OCT. 3, 1905.
M. NIKOLIC.
SAFETY DEVICE FOR TRAINS.
APPLICATION FILED JUNE 30, 1905.

Witnesses:

Inventor
Milan Nikolic.
by N. C. Evert Co.
Attorneys.

No. 801,039. PATENTED OCT. 3, 1905.
M. NIKOLIC.
SAFETY DEVICE FOR TRAINS.
APPLICATION FILED JUNE 30, 1905.

UNITED STATES PATENT OFFICE.

MILAN NIKOLIC, OF PITTSBURG, PENNSYLVANIA.

SAFETY DEVICE FOR TRAINS.

No. 801,039.    Specification of Letters Patent.    Patented Oct. 3, 1905.

Application filed June 30, 1905. Serial No. 267,822.

*To all whom it may concern:*

Be it known that I, MILAN NIKOLIC, a subject of the Emperor of Austria-Hungary, residing at Pittsburg, in the county of Allegheny and State of Pennsylvania, have invented certain new and useful Improvements in Safety Devices for Trains, of which the following is a specification, reference being had therein to the accompanying drawings.

This invention relates to certain new and useful improvements in safety devices for trains and vehicles; and the invention relates more particularly to a novel form of device particularly adapted for railroad-trains.

My invention aims to provide a safety device adapted to be carried by the locomotive of a train to prevent the train from colliding with another train or object, to prevent a person or object from being run down by the train, and to prevent the train from being derailed or demolished by a structure over which it passes, such as a bridge, being broken or washed away.

To this end I have devised a novel device adapted to be attached to the locomotive of a train, and in connection with the device I have employed novel means to be automatically and electrically actuated to signify when the device contacts with an object and when a broken rail or a similar defect is encountered in the road-bed over which the train is passing.

I have also devised novel means in connection with my improved device to sound an alarm and eventually stop a train when a bridge or elevated structure is encountered which has been broken or partially washed away.

A further object accomplished by my improved device is the sounding of alarms at predetermined points along the railway over which the device passes, such as crossings and railway-stations.

The primary intention of the invention is to dispense with "head-on" and "rear-end" collisions of trains and in general provide for the safe passage of a train over a trackway without injuring the train or any objects or persons with which it may come in contact.

With these and many other objects in view, which will more readily appear as the nature of the invention is better understood, the same consists in the novel construction, combination, and arrangement of parts, which will be more fully described, illustrated, and claimed hereinafter.

The essential features of the present invention involved in carrying out the objects above specified are necessarily susceptible to structural change without departing from the scope of the invention; but the preferred embodiments of the invention are shown in the accompanying drawings, in which—

Figure 1 is a side elevation of a trackway or road-bed equipped with my improved device. Fig. 1ª is a side elevation of a continuation of the trackway or road-bed shown in Fig. 1. Fig. 7 is a transverse sectional view of a railroad equipped for the operation of my improved device, illustrating a trackway in which the device is adapted to travel.

In describing the invention in detail reference will first be had to Figs. 1, 7, 9, and 12 of the drawings, wherein I have illustrated a road-bed and railway equipped for the operation of my improved device.

Figure 8:
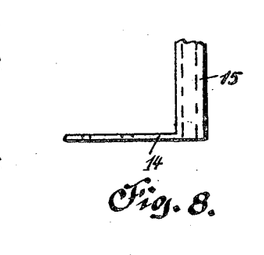
Fig. 8 is a top plan view of a tie-plate used in connection with the trackway.
Figures 9, 10:
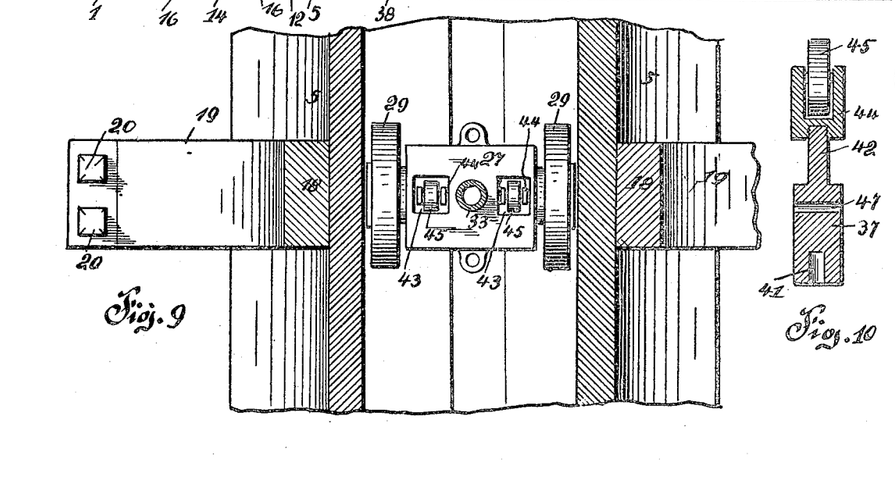
Fig. 9 is a horizontal sectional view taken on the line $x\ x$ of Fig. 7.
Fig. 10 is an enlarged detail sectional view of part of the mechanism used for lubricating my improved device.
Figure 11:
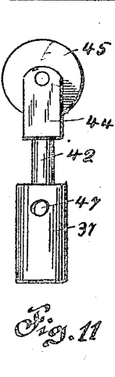
Fig. 11 is a side elevation of the same.
Figure 12:
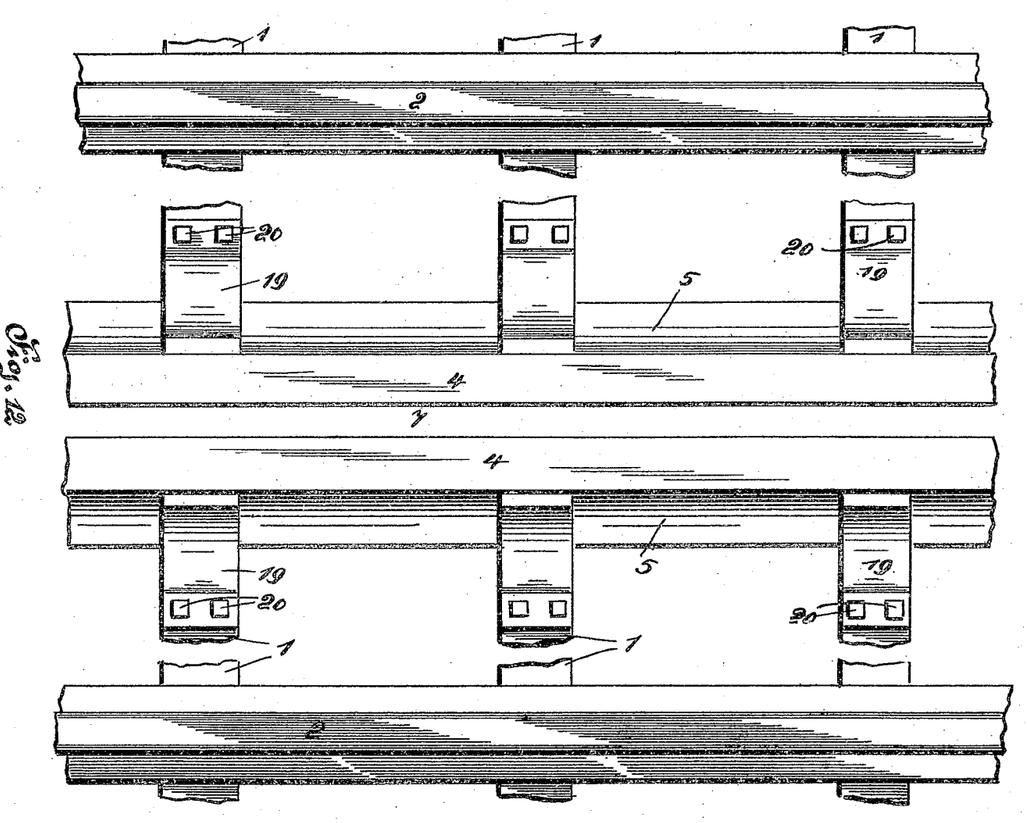
Fig. 12 is a fragmentary plan view of a railroad constructed in accordance with my invention.

The reference-numerals 1 designate the ties or sleepers of the railroad upon which tracks 2 2 are secured by a conventional form of spikes 3. Centrally of the tracks 2 2 and extending the entire length of the road I mount a third rail or track 4, which consists of a housing or casing in which my improved device is adapted to travel. The housing comprises substantially channel-shaped frames 5 5, which are arranged to confront one another to form a continuous compartment 6, having a slot 7 formed in its top. The bottoms of the frames 5 5 are flanged inwardly, as at 8 8, to form trackways 9 9 within the continuous compartment 6, these trackways being provided with ribs 10 10, which serve functionally as guard-rails for the device traveling within the compartment 6. The outer sides of the frames 5 5 are flared outwardly to brace the frames 5 5 upon the ties or sleepers 1, spikes 11 11, similar to the spikes 3, being employed to fasten the frames 5 5 to the sleepers or ties. The bottoms of the frames 5 5 are provided with substantially T-shaped slots 12 12, which are longitudinally disposed in the frames, and at each tie or sleeper a tie-plate 14 is employed to further lock the frames 5 5 in engagement with the tie and prevent lateral displacement. One of these plates is illustrated in Fig. 8 of the drawings, where it will be seen that the plate is provided with an angularly-disposed arm 15, which is substantially T-shaped in cross-section, corresponding to the shape of the slot 12. These arms are adapted to be placed within the slots 12 of the frames 5 5, while the plates 14 are secured to the sides of the ties or sleepers by screw-bolts 16. To further brace the frames 5 5 upon the ties of the rod, I provide the top outer edges of each frame with substantially wedge-shaped grooves 17 17, and in these grooves are adapted to fit tongues 18 18, carried by curved braces 19 19, which are secured to the ties 1 by spikes or screw-bolts 20 20, these braces also serving to prevent lateral displacement of the frames 5 5.

Before describing my improved device, which is adapted to travel within the compartment 6 of the track just described, I wish it to be understood that this trackway or compartment 6 is constructed the entire length of a railroad, or at least upon that portion of the road over which trains or locomotives travel.

Figures 1, 1A:
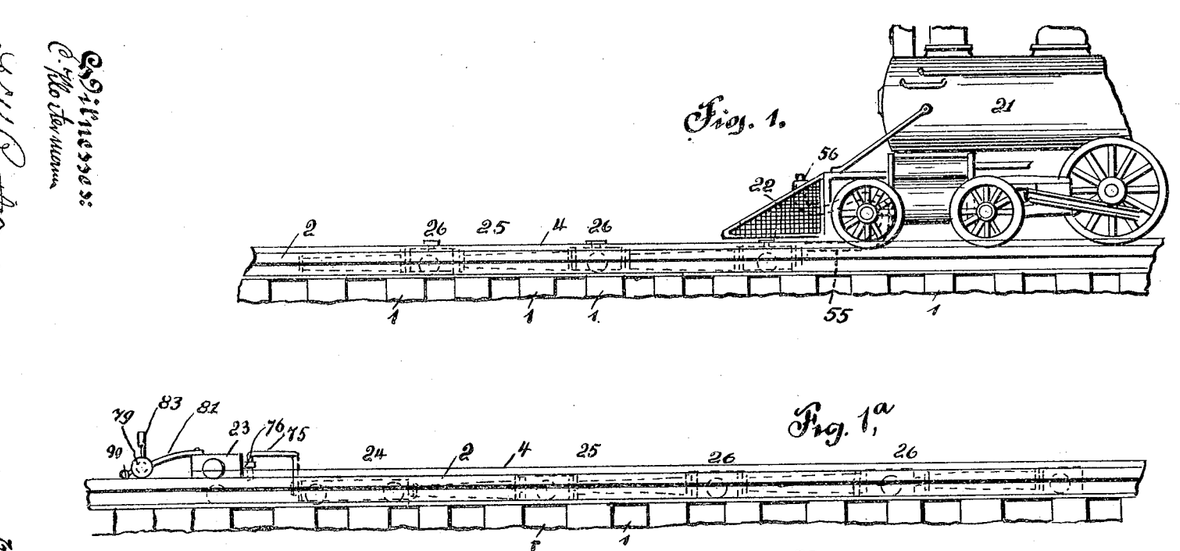
Figure 2:
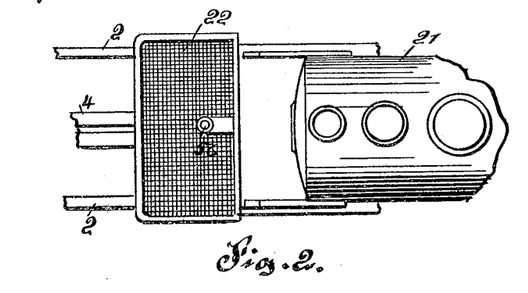
Fig. 2 is a top plan view of a portion of a locomotive, illustrating the connection of my improved device to said locomotive.

In Fig. 1 of the drawings I have illustrated a portion of a locomotive, which I have designated 21, and this locomotive is to be equipped with a pilot or "cow-catcher" 22 of a greater width than the space existing between the rails 2 2 of the road, thereby preventing a person or object being struck by the pilot from being thrown in between the rails 2 2 or injured by contacting with the working parts of the locomotive.

The device as carried and moved by the locomotive 21 consists of three parts—namely, a pilot-truck 23, a truck 24, and a resilient section 25, consisting of a plurality of trucks 26. I will first describe the resilient section 25, which is illustrated in Figs. 1, 4, 5, 7, and 9 of the drawings. The resilient section, as heretofore stated, consists of a plurality of trucks 26, and each truck comprises a box-like frame 27, carrying an axle upon the ends of which are journaled wheels 29 29, a conventional form of ball-bearing 30 being employed in connection with the spindle 31 of the axle 28 and the wheels 29 29. Between the top of the axle 28 and the top of the box-like frame 27 is formed a lubricant-receptacle 32, and the top of the frame 27 is provided with and upwardly-extending spout 33, which communicates with said receptacle. The upper end of the spout 33 extends through the slot 7 of the track 4, and a screw-threaded cap 34 is employed as a closure for the spout 33. A by-pass or passage-way 35 exists between the top of the axle 28 and the frame 27, this passage-way or by-pass being employed to feed a lubricant contained within the receptacle 32 to the ball-bearings of the wheels 29 29 at predetermined times. The axle 28 of the frame 27 is provided with vertically-disposed openings 36, in which are mounted plungers 37 37, these plungers being normally held in an elevated position by springs 38, mounted upon stud-pins 39, carried by a plate 40, secured to the bottom of the frame 27. The lower ends of the plungers 37 are provided with openings 41, adapted to receive the ends of the stud-pins 39 when the plungers are depressed. The upper ends of the plungers 37 are contracted, as indicated at 42, and extend into recesses 43, formed in the top of the frame 27 and diametrically opposed relatively to the spout 33. Boxes 44 are carried by the contracted ends 42 of the plungers 37. In these boxes are journaled rollers 45. These rollers are adapted to engage cam-shaped blocks 46, carried by the frames 5 5 at predetermined points in order that the plungers 37 may be depressed. It will be observed that the normal position of the plungers intersects the by-pass or passage-ways 35, and in order that the lubricant contained within the receptacle 32 may be fed to the wheels 29 I provide the plungers with apertures or openings 47, which establish communication between the wheels 29 29 and the receptacle 32 when the plungers are actuated by the cam-shaped blocks 46, carried by the frames 5 5. Journaled in the bottom of the frame 27 is a roller 48, and formed longitudinally through the axle 28 and the frame 27 is an opening 49. The object of said opening and the roller 48 will be hereinafter more fully described.

Figures 4, 5:
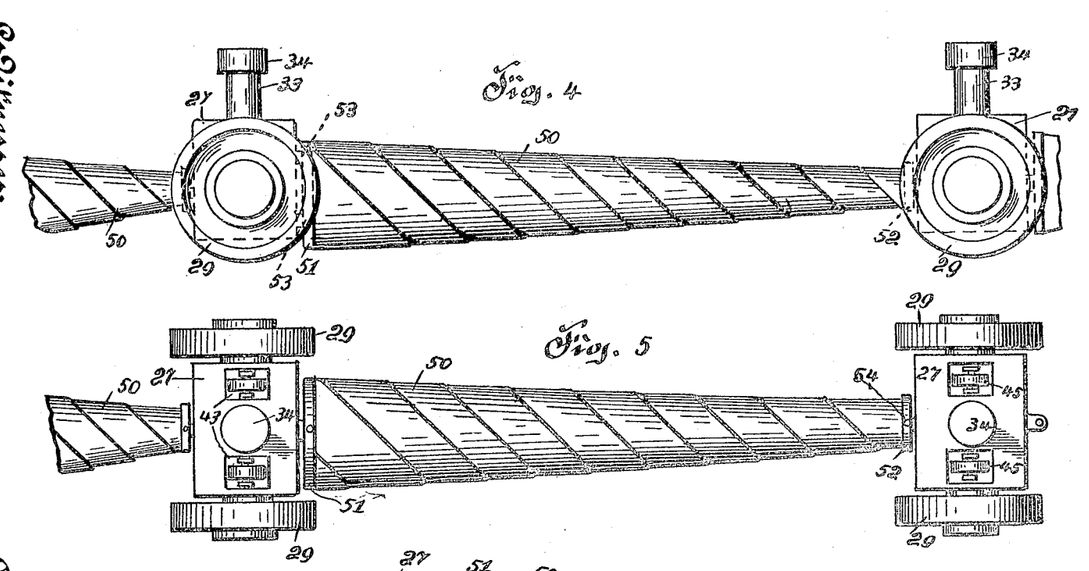
Fig. 4 is a side elevation of a portion of the device.
Fig. 5 is a top plan view of the same.
Figure 6:
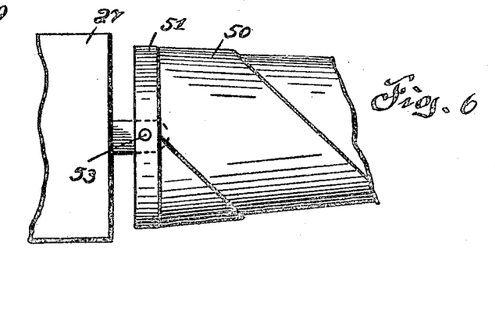
Fig. 6 is a plan view of a portion of the device upon a larger scale.

By referring to Fig. 1 and Fig. 1ª of the drawings it will be observed that I have used seven of the trucks 26, all of which are identical in construction; but I do not care to confine myself to this specific number of trucks, as the resilient portion of the device may be made shorter or longer, as desired. The resilient part of the section 25 extends between the trucks 26, this resilient part consisting of a plurality of spirally-wound band-springs 50, the ends of said springs carrying suitable heads 51 and 52. The normal position of these springs is illustrated in Figs. 4 and 5 of the drawings, said springs serving to retain the trucks 26 26 a prescribed distance apart. The heads 51 of the springs 50 are pivotally connected to the trucks 26, as indicated at 53 53, while the heads 52 of the springs 50 are pivotally connected to the trucks, as indicated at 54, these connections permitting of a slight swinging movement of the trucks relative to the springs 50.

The resilient section 25 of the device is connected to the locomotive 21 by providing the last truck 26 or the truck nearest the locomotive with an upwardly-extending curved arm 55, which is detachably connected to the forward part of the locomotive 21, as indicated at 56.

Figure 17:
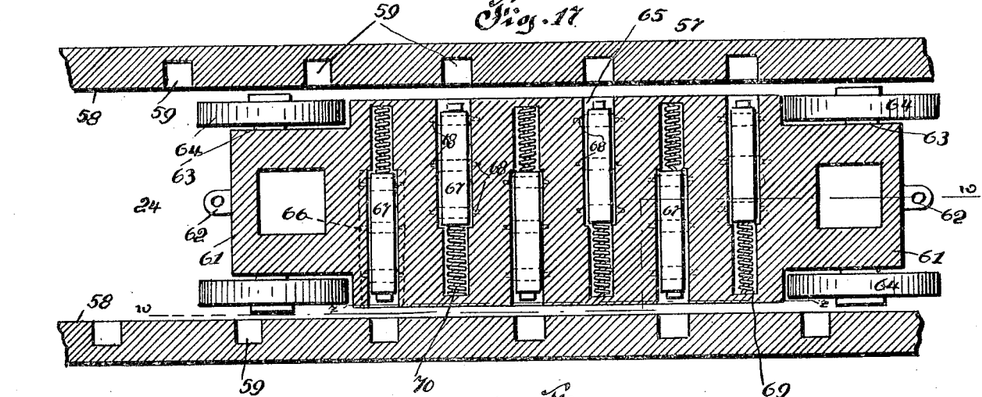
Fig. 17 is a horizontal sectional view of part of the device and a portion of an elevated structure constructed in accordance with my invention.
Figure 18:
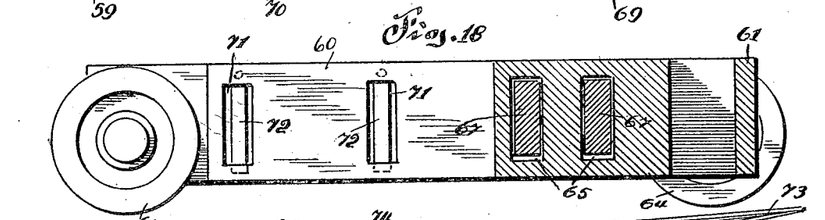
Fig. 18 is sectional view of that part of the device illustrated in Fig. 17 of the drawings, taken on the line $w\ w$ of said Fig. 17.
Figure 19:
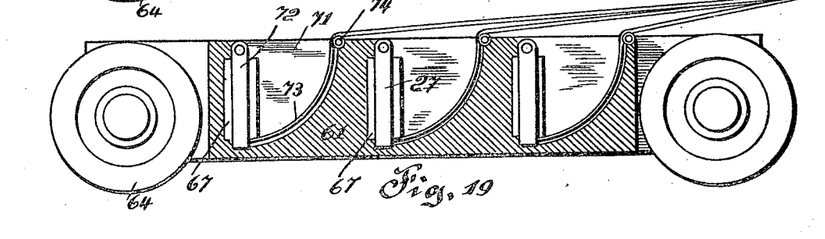
Fig. 19 is a longitudinal vertical sectional view taken on the line $z\ z$ of Fig. 17.

Reference will now be had to the truck 24, which is illustrated in Figs. 17 to 19, inclusive. This truck is used in connection with a specially-constructed track 51, which is employed upon elevated structures, such as bridges, and the truck is provided with novel means adapted to be automatically actuated by the forward end of my improved device, having its path of travel interrupted, such as would be the case if a portion of a bridge was broken or washed away. In other words, the truck 24 is employed for preventing the locomotive 21 and the train which it is hauling from being precipitated into a river or opening caused by a broken or open bridge. The confronting sides of the frames 58 58, which form the track 57, are provided with a plurality of horizontal openings 59, the openings in one frame being staggered relatively to the openings of the other frame—that is, no two openings are opposite each other. The truck 24 consists of a frame 60, having contracted ends 61 61, carrying upwardly-extending pierced lugs 62 62, which serve as coupling members for connecting the truck 24 to the resilient section 25 of the device and the truck 23. The contracted ends of the frames 60 are provided with stub-axles 63 63, upon which are journaled wheels 64 64, these wheels being adapted to travel upon the trackways 9 of the track 57. The sides of the frame 60 are provided with vertically-disposed openings 65, the openings upon one side of the frame being staggered relative to the openings upon the opposite side. The sides of these openings are slotted, as indicated at 66, and in said openings are mounted blocks 67 67, carrying outwardly-extending pins 68 68, that extend into the slots 66 of the openings 65. The rear end of each of the openings 65 is recessed, as indicated at 69, and in said recesses are mounted springs 70, which normally tend to force the blocks 67 outwardly against the sides of the frames 58 58. In each side of the frame 60 adjacent to each one of the openings 65 I provide a substantially sector-shaped slot 71, and pivotally mounted at the vertical edge of said slot is a bar 72, which is connected by a cable 73 to the truck 23 of the device, said cables passing over pulleys 74, journaled in the slots 71 at the upper edge of the frame. The position of the truck 24 illustrated in Fig. 19 of the drawings is the reverse of the position illustrated in Fig. 1 of the drawings; but it will be understood that the cables 73 are attached to the truck 23. The inoperative position of the blocks 67 is maintained by the bars 72, which prevent the blocks 67 from springing outwardly and engaging in the openings 59 of the frames 58 58. The cables 73 are loosely held by the connection existing between the truck 23 and the truck 24; but should the truck 23 be derailed or precipitated into an opening caused by an "open bridge" the cables 73 will be drawn taut and pulled upon, elevating the lower ends of the bars 72, consequently moving them out of engagement with the blocks 67, and this movement of the bars 72 permits of the springs 70 forcing the blocks 67 outwardly into the openings 59 59 of the frames 58 and stopping the further progress of the device. This operation of the truck 24, which travels a considerable distance ahead of the locomotive 21, notifies the engineer or fireman of the locomotive of the opening existing in the elevated structure or bridge, and the engineer or fireman has sufficient time to stop the locomotive and its train before the opening is reached and the resilient portion or section of the device has been compressed.

The truck 23 is similar in all respects to the trucks 26, with the exception that the truck 23 is connected to the truck 24 by a link 75, carried by the truck 24, the forward end of this link being swiveled in the coupling member 76, carried by the rear end of the truck 23. In connection with the truck 23 an auxiliary truck is used, which consists of an axle 77, upon the spindles 78 of which are journaled wheels 79, a conventional form of ball-bearings 80 being employed in connection with the wheels and the spindles. The wheels are adapted to travel upon the rails 2 2 of the road, and the axle 77 is supported from the truck 23 and guided in its movement by forwardly-extending arms 81, these arms being secured to the top of the truck 23 and clamped around the axle 77. The axle 77 is provided with a standard 82, carrying a pilot-light 83 of a conventional form. The standard 82 is provided with an arm 84, which supports a bell 85. The stub-shaft 86 is also carried by the standard 82, and upon this stub-shaft is journaled a pinion 87, which meshes with a pinion 88, journaled upon the spindle 88 and secured to the side of the wheel 79. A lever 89 is pivotally connected to the standard 82, as indicated at 90, and the one end of said lever extends upwardly into the bell 85 and is provided with a clapper 91, while the opposite end of the lever is provided with a tooth 92, adapted to be struck by the periphery of the pinion 87. It is evident from the construction that when the wheel 79 is rotated the ball 85 will be continuously sounded, and this bell is adapted to serve as an alarm to all beings in the path of the locomotive and its train.

The axle 77 centrally of its length is provided with a depending hanger 93, carrying a block 94 within the track 4. Spring-pressed wheels 95 95 are journaled in the block 94, these wheels being adapted to bear against the tops of the frames 5 5 and recede when said wheels pass over the cam-shaped blocks 46 46 of the track 4.

The axle 77 is provided with straps 96 96, supporting a transversely-disposed rod 97 97. This rod carries forwardly-depending arms 98 98 upon its end in front of the wheels 79 79. The end of each arm is provided with a pivotally-mounted member 99, which is preferably provided with a resilient coating 100, of rubber or the like material. The arm 98 is provided with a contact-block 101, while the member 99 is provided with a contact-block 102.

Figure 3:
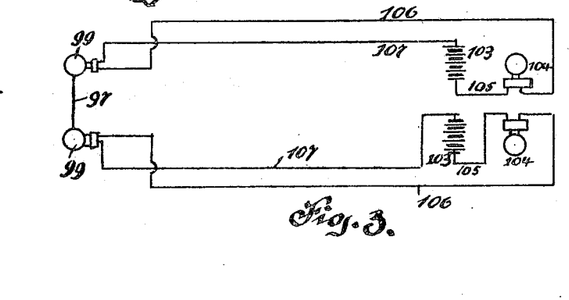
Fig. 3 is a diagrammatic view of my improved device, illustrating the electrical connections thereof.
Figures 13, 14, 15, 16, 21:
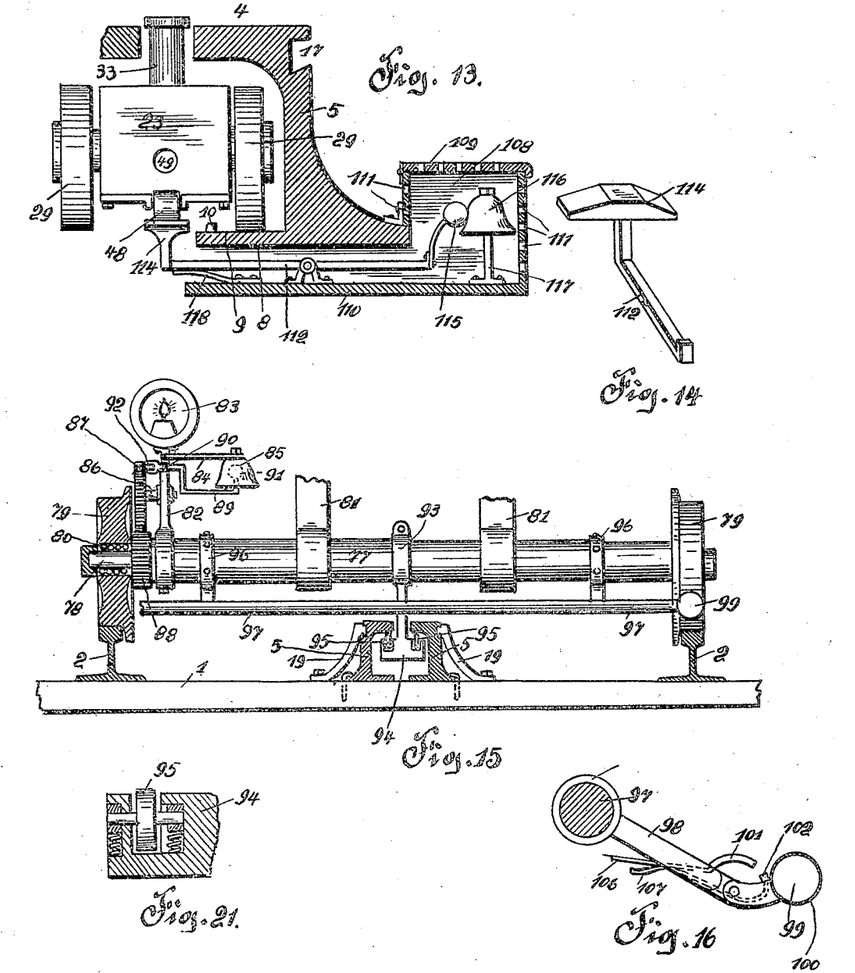
Fig. 13 is a vertical sectional view of a portion of the device adapted to be used at crossings or railway-stations along the road upon which my improved device is operated.
Fig. 14 is a perspective view of a shoe used in connection with the device illustrated in Fig. 13.
Fig. 15 is a front elevation of the forward end of my improved device, partly in section.
Fig. 16 is a side elevation of a bar employed upon the forward end of my improved device and serving functionally as a fender.
Fig. 21 is a sectional view of a portion of the forward end of the device.

Reference will now be had to Fig. 3 of the drawings in conjunction with Fig. 16, it being observed that I have employed certain electrical devices in connection with my improved device. In the cab of the locomotive 21 I provide batteries 103 103 or other suitable source of electrical energy. Electric bells or suitable alarms 104 104 are also employed, one of these alarms being intended to notify the engineer, while the other of said alarms notifies the fireman of the locomotive of an abnormal condition of the device hereinbefore described. The batteries and the electric bells are connected together by wires 105 105, and the bells are also connected by wires 106 106 to the contact-blocks 102, carried by the members 99 99. The batteries 103 103 are connected by wires 107 107 with the contact-blocks 101, carried by the arms 98 98. These wires are adapted to pass through the openings 49 of the trucks 26 under the truck 24, through the opening 49 of the truck 23 to the rod 97, from where they pass to their respective contact-blocks. During the operation of the device should the members 99 99 contact with an object or person these members will be forced upwardly until the contact-blocks 102 engage the contact-blocks 101, completing a circuit through the wires to the batteries 103 103, sounding the electric bells 104 104, and notifying the engineer and fireman that the device has struck an object or person, and, if necessary, the locomotive and its train can be stopped. The resilient material 100, which covers the members 99, forms a cushion for the object or person being struck and prevents the object or person being injured or contacting with the members.

In Fig. 13 of the drawings I have illustrated a novel device adapted to be used at crossings and railway-stations, where it is essential that an alarm be sounded prior to the appearance of the locomotive and its train, as in some instances, owing to the great length of the device, the locomotive and its train may be out of sight when the truck 23 has reached a crossing or station. The device consists of providing one of the frames 5 of the track 4 with a casing 108, having a hinged perforated lid 109. A portion of the casing 108 extends under the frame 5, as indicated at 110, and the sides of the casing extending from beneath the frame 5 are perforated, as at 111. Upon that portion of the casing extending beneath the frame 5 I fulcrum a lever 112, the forward end of which carries a shoe 114, while the opposite end of said lever is provided with a tapper 115, which is adapted to strike a bell 116, suspended from a suitable bracket 117, mounted in the casing 108. A spring 118 is employed to normally hold the one end of the lever 112 in an elevated position. The shoe 114 is actuated by the rollers 48, journaled in the bottom of each of the trucks 24 and the truck 23, and as each truck passes over the shoe 114 it will be depressed, and when released the spring 118 will force the tapper 115 into engagement with the bell 116 and sound the alarm that the locomotive 21 is approaching, warning all persons and animals not to trespass upon the railroad.

Figure 20:
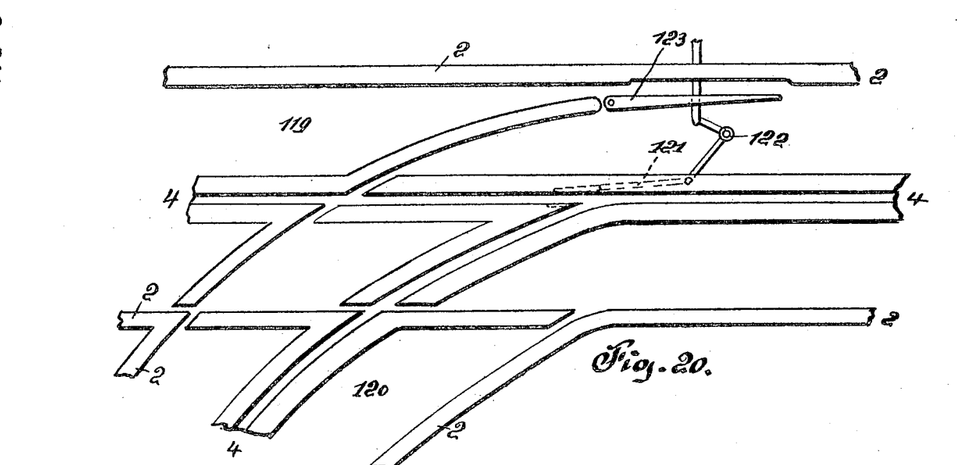
Fig. 20 is a plan view of a portion of a railroad constructed in accordance with my invention, illustrating the construction employed at a switch.

Reference will now be had to Fig. 20 of the drawings, wherein the main track 119 of the road and the siding-track 120 are equipped with tracks 4 4 of my improved device. In order that a train equipped with my improved device may enter the siding-track 120, the track 4 of the siding must intercept the track 4 of the main track 119, and to insure a perfect passage of the device upon the siding-track 120 I employ a switch-tongue 121, which is actuated by a toggle-lever 122, this toggle-lever being connected to the ordinary switch-tongue 123 generally used in connection with switches and operated by suitable means. (Not shown.) It will be observed that when the switch-tongue 123 is closed to permit the locomotive 21 to pass upon the siding-track 120 the switch-tongue 121 will be moved in the opposite direction to close the track 4 and permit the device to pass upon the track 4 of the siding-track 120.

In practice I find it best to detach my improved device from a train before it enters a railway-station, owing to the length of the device, and to again attach it to the train when the train leaves the station.

It will be evident from the novel construction which I employ in connection with my improved device that all forms of collisions will be avoided, in most instances the device being wrecked before the train collides with an object or another train. It will be also impossible for the train to be derailed by misplaced switches, broken rails, or imperfect elevated structures, as the device will first be injured and notify the engineer or fireman in time to stop the locomotive and its train.

It is thought from the foregoing that the construction, operation, and advantages of the herein-described safety device will be apparent without further description, and various changes in the form, proportion, and minor details of construction may be resorted to without departing from the spirit of the invention or sacrificing any of the advantages thereof.

What I claim, and desire to secure by Letters Patent, is—

1. In a device of the type described, the combination with tracks and a locomotive adapted to travel over said tracks, of a third track, said track consisting of a casing having a slot formed therein, a plurality of resiliently-connected trucks adapted to travel within said casing, said casing having openings formed therein, a truck connected to the first-named trucks, spring-actuated blocks mounted in said truck and adapted to engage in said openings, a truck connected to the last-named truck, an axle carried by said truck, wheels journaled upon said axle and adapted to travel upon said tracks, an alarm carried by said axle and actuated by said wheels, a search-light carried by said axle, a rod carried by said axle, means to connect the first-named trucks to said locomotive, means to lubricate said trucks, means mounted adjacent to said tracks and actuated by said trucks to sound an alarm, means carried by the second-named truck and actuated by the disconnection of the last-named truck to release said spring-actuated blocks, means carried by said rod and said trucks to sound an alarm upon said locomotive, substantially as described.

2. In a device of the type described, the combination with tracks and a locomotive, of a third track consisting of a casing, trucks mounted in said casing, said casing having openings formed therein, a truck connected to the first-named trucks, blocks mounted in said trucks and adapted to engage in said openings, a truck connected to the second-named truck, means to resiliently connect the first-named trucks together, means to detachably connect said trucks to said locomotive, means carried by said trucks to lubricate the same, means mounted adjacent to said tracks and actuated by said trucks to sound an alarm, means carried by the second-named truck and actuated by the first-named truck to move said blocks into said openings, means carried by the last-named truck to sound an alarm in said locomotive, and means carried by said truck and actuated by the movement of said truck to sound an alarm upon said truck, substantially as described.

3. In a device of the type described, the combination with tracks and a locomotive, of a second track consisting of a casing, trucks resiliently connected together, and adapted to travel in said casing, a lubricating-receptacle carried by each truck, movable blocks mounted in each truck and controlling the outlet of said receptacle, means carried by said tracks to actuate said blocks, means carried by one of said trucks to engage the sides of said track by the disconnection of one of said trucks, means mounted adjacent to said tracks and actuated by said trucks to sound an alarm, means carried by one of said trucks to sound an alarm upon said truck, means carried by one of said trucks to sound an alarm in said locomotive, and means to connect said trucks to said locomotive, substantially as described.

4. In a device of the type described, the combination with tracks and a train, of a third track consisting of a casing, resiliently-connected trucks adapted to travel in said casing, means carried by each truck and actuated by the movement of said trucks to lubricate the wheels of said trucks, means to connect said trucks to said train, means carried by one of said trucks to engage the sides of said truck, said means being actuated by the disconnection of one of said trucks, means mounted adjacent to said tracks and actuated by the movement of said trucks to sound an alarm, means carried by one of said trucks and operated by said trucks to sound an alarm, means carried by said truck to sound an alarm within said train, substantially as described.

5. In a device of the type described, the combination with tracks and a train, of a third track consisting of a casing, a plurality of trucks adapted to travel within said casing, spirally-wound springs interposed and carried between said trucks, means to connect said trucks to said locomotive, means to lubricate said trucks, means carried by one of said trucks and automatically actuated to grip the sides of said track, means mounted adjacent to said tracks and actuated by the movement of said trucks to sound an alarm, electrically-actuated means carried by one of said trucks, to sound an alarm within said train, substantially as described.

6. In a device of the type described, the combination with tracks and a train, of a third track consisting of a casing, a plurality of trucks connected to said train and adapted to travel in said casing, means to resiliently connect said trucks together, means carried by one of said trucks, and automatically actuated to grip the sides of said casing, means mounted adjacent to said tracks and actuated by the movement of said trucks to sound an alarm, electrically-actuated means carried by said trucks, to sound an alarm within said train, substantially as described.

7. The combination with a third track and a train, of a plurality of resiliently-connected trucks adapted to travel in said third track ahead of said train, means carried by one of said trucks and automatically actuated to grip the sides of said track, means mounted adjacent to said third track and actuated by the movement of said trucks to sound an alarm, and means carried by said trucks to sound an alarm within said train, substantially as described.

8. The combination with a train, of a third track consisting of a casing, trucks adapted to travel in said casing and propelled by said train, means to resiliently connect said trucks together, means to lubricate said trucks, means mounted adjacent to said track and actuated by said trucks to sound an alarm, means carried by one of said trucks to grip the sides of said casing, and means carried by one of said trucks, to sound an alarm within said train, substantially as described.

9. The combination with a train, of a third rail consisting of a casing, trucks adapted to travel in said casing, and be propelled by said train, means to resiliently connect said trucks together, means carried by one of said trucks to grip the sides of said casing, and means actuated by said trucks to sound an alarm, in the vicinity of said train, substantially as described.

10. The combination with a train, of a third track consisting of a casing, trucks adapted to travel in said casing and to be propelled ahead of said train, means to resiliently connect said trucks together, and means actuated by the movement of said trucks to sound an alarm in the vicinity of said train, substantially as described.

11. The combination of a train, trucks mounted in front of said train, and resiliently connected together, means actuated by said trucks to sound alarms located along the track, said alarms and means carried by one of said trucks to sound an alarm in said train, substantially as described.

12. The combination of a train, trucks mounted in front of said train, and resiliently connected together, means actuated by said trucks to sound an alarm arranged alongside the track and said alarm, substantially as described.

In testimony whereof I affix my signature in the presence of two witnesses.

MILAN NIKOLIC.

Witnesses:
  H. C. EVERT,
  J. A. MEANS.